United States Patent Office 3,200,113
Patented Aug. 10, 1965

3,200,113
7-CYANO STEROIDS AND DERIVATIVES THEREOF
Robert G. Christiansen, Schodack, N.Y., and William S. Johnson, Portola Valley, Calif., assignors to Sterling Drug Inc., New York, N.Y., a corporation of Delaware
No Drawing. Filed Jan. 9, 1963, Ser. No. 250,243
30 Claims. (Cl. 260—239.5)

This invention relates to new steroid compounds derived from the addition of cyanide to steroids of the 3-oxo-4,6-androstadiene series and to processes for their preparation.

One aspect of the invention relates to compounds of the formula

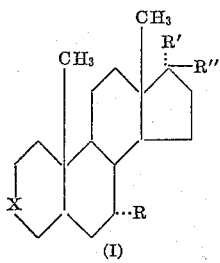

(I)

wherein R is cyano, carboxy, carbo-lower-alkoxy, hydroxymethyl or lower-carboxylic acyloxymethyl, R′ is hydrogen or lower-alkyl, R″ is hydroxy or lower-carboxylic acyloxy, and X is O=C or (α—HO)CH; to compounds of the above formula wherein X is O=C having a double bond at the 4,5-position; to compounds of the above formula wherein X is O=C having two double bonds, one at the 1,2- and the other at the 4,5-position; and to the corresponding compounds wherein R′ and R″ together represent carbonyl oxygen.

In compounds of the Formula I where R is carbo-lower-alkoxy or R′ is lower-alkyl, the lower-alkoxy or lower-alkyl groups preferably have from one to four carbon atoms.

In compounds of Formula I where R is lower-carboxylic acyloxymethyl or R″ is lower-carboxylic acyloxy, the lower-carboxylic acyl groups are preferably derived from carboxylic acids having from one to about ten carbon atoms, conventionally employed in the steroid art, and having a molecular weight less than about 200. Representative of the acyl radicals which can be present are lower alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals such as phenylacetyl, β-phenylpropionyl, cinnamoyl, and the like; and monocarbocyclic aryloxy-lower-alkanoyl radicals, such as p-chlorophenoxyacetyl, and the like.

The compounds of Formula I are prepared by way of the addition of one mole-equivalent of alkali metal cyanide to a 4,6-diene of the Formula II:

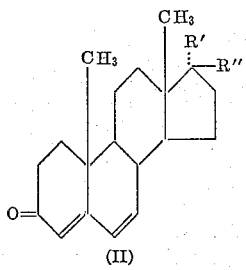

(II)

wherein R′ and R″ have the meanings given hereinabove. The mono-adduct thus produced has the structure:

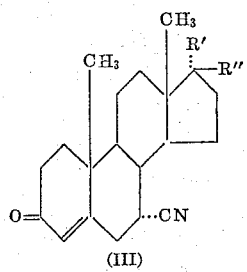

(III)

The reaction is carried out by heating the compound of Formula II with an alkali metal cyanide at a temperature between about 50° C. and 150° C. in an inert solvent mixture which serves to dissolve at least partially both the steroid and the cyanide.

Other compounds within the scope of Formula I are prepared from compounds of Formula III by the appropriate hydrolytic, reduction or esterification reactions, as illustrated in the following flow sheet:

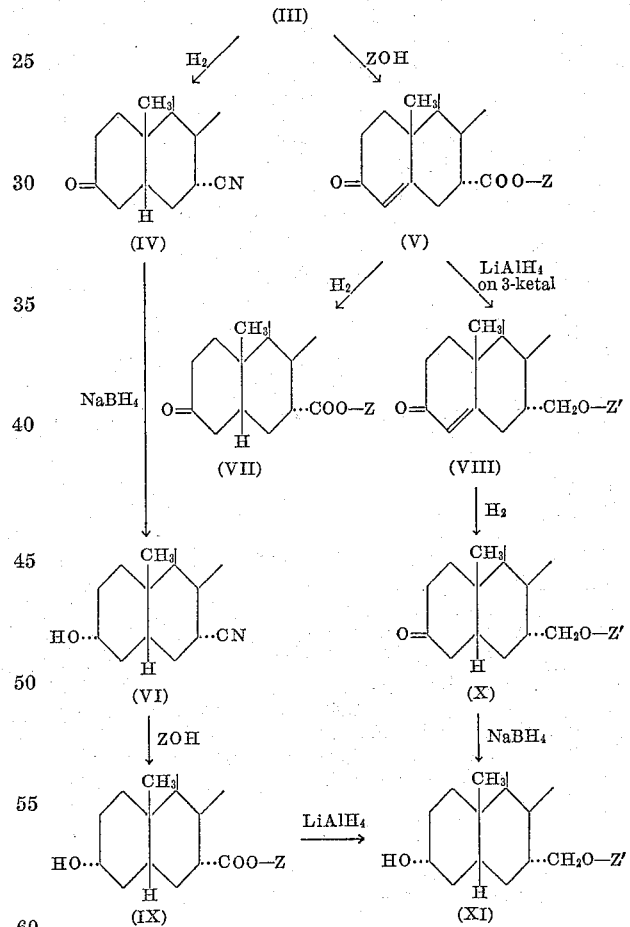

In the foregoing formulas Z stands for hydrogen or lower-alkyl and Z′ stands for hydrogen or carboxylic acyl.

A 7α-cyano-3-oxo-4-androstene compound (III) can be hydrogenated catalytically to saturate the ring double bond to produce a 7α-cyano-3-oxo-5β-androstane (IV); and the former can also be subjected to hydrolysis or alcoholysis in the presence of a base to give a 7α-carboxy-(or carbo-lower-alkoxy)-3-oxo-4-androstene (V). Sodium borohydride reduction of a 7α-cyano-3-oxo-5β-androstane (IV) provides the corresponding 7α-cyano-3α-hydroxy-5β-androstane (VI). A 7α-carboxy(or carbo-lower-alkoxy)-3-oxo-4-androstene (V) can be catalytically hydrogenated to give a 7α-carboxy(or carbo-lower-alkoxy)-3-oxo-5β-androstane (VII), or reduced with lithium aluminum hydride while protecting the 3-oxo group as a ketal to give a 7α-hydroxymethyl-3-oxo-4-androstene (VIII). Compounds wherein Z' is carboxylic acyl can be prepared by conventional esterification reactions. In similar fashion, a 7α-cyano-3α-hydroxy-5β-androstane (VI) can be subjected to hydrolysis or alcoholysis to produce a 7α-carboxy(or carbo-lower-alkoxy)-3α-hydroxy-5β-androstane (IX); and a 7α-hydroxy-methyl-3-oxo-4-androstene (VIII) upon catalytic hydrogenation yields a 7α-hydroxymethyl-3-oxo-5β-androstane (X). Finally, a 7α-hydroxymethyl-3α-hydroxy-5β-androstane (XI) is obtained either by lithium aluminum hydride reduction of (IX) or sodium borohydride reduction of (X).

A compound of Formula VIII wherein Z' is hydrogen readily cyclizes in the presence of base by addition to the double bond to form a 5α,7α-epoxymethano compound of the following Formula XII:

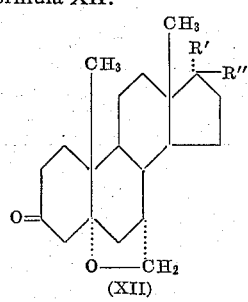
(XII)

A compound of Formula VIII wherein Z' is hydrogen also can undergo dehydration in the presence of p-toluenesulfonyl chloride to give a 6α,7α-methano compound, viz.:

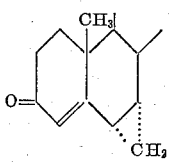

The presence of a cyclopropane ring was established by infrared and nuclear magnetic resonance spectra.

The compounds of Formula I wherein R' is H and R" is OH can readily be oxidized, as with chromic oxide in acetic acid, to form the corresponding 17-oxo compounds. The 17-oxo-compounds can be carried through the same series of reactions depicted in the above flow sheet (III)→(XII), provided the 17-oxo group is protected as a ketal during metal hydride reduction.

A second double bond, in the 1,2-position can be introduced into compounds of Formula III, V or VIII by bromination in the 2-position with N-bromosuccinimide, followed by dehydrobromination, for example with lithium bromide and lithium carbonate.

Another aspect of the invention relates to compounds obtained by way of the addition of two mole-equivalents of cyanide to the 4,6-androstadien-3-one moiety, as depicted in the following flow sheet:

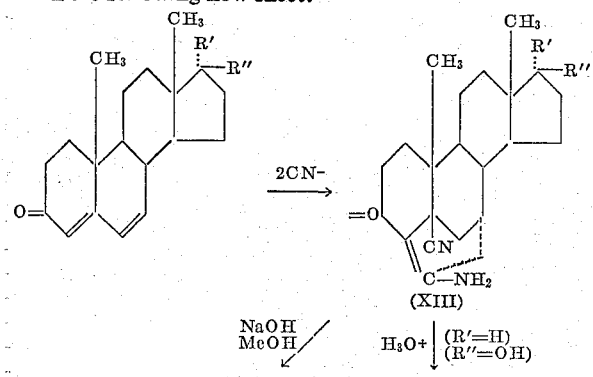

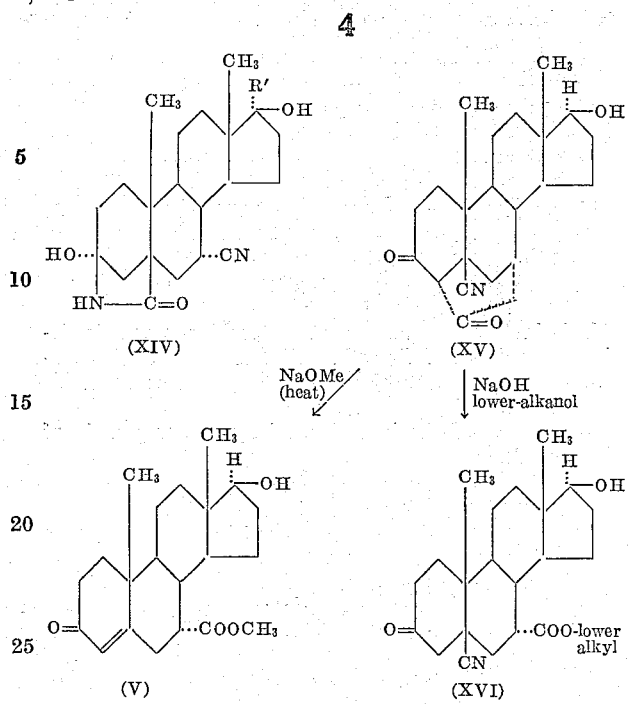

In the foregoing formulas, R' and R" have the same meanings given hereinabove.

When 17α-R'-4,6-androstadien-17β-ol-3-one, or an ester thereof, is treated with two or more molar equivalents of an alkali metal cyanide, the product is separable into an acid-soluble and a neutral fraction. The neutral fraction contains some starting material and some of the mono-adduct (III), as well as some 5,7-dicyano-17α-R'-androstan-3-one. The acid-soluble (basic) fraction affords an enamino ketone (XIII), resulting from an intramolecular condensation of 7α-cyano group of the intermediate 5β,7α-dicyano compound with the C–4 anion produced in the basic medium. The enamino ketone structure is consistent with the infra-red and ultraviolet spectral data, with the fact that it gives a purple color with methanolic ferric chloride, and with the chemical transformations described below. Its structure is an example of the $\Delta^{1,9}$-(4.3.1)-bicyclodecene system, and molecular models surprisingly can be constructed without serious angular distortion, despite the apparent conflict with Bredt's Rule, that a double bond cannot extend to a bridgehead.

On treatment of the amino ketone (XIII) with a strong base, e.g., methanolic sodium hydroxide, it is converted to 3β-amino-5-carboxy-7α-cyano-17α-R'-5β-androstane-3α,17β-diol-(3,5-lactam) (XIV).

Hydrolysis of the enamino ketone (XIII, R'=H) with hot aqueous acid, such as dilute hydrochloric acid, gives 4α,7α-carbonyl-5-cyano-17β-hydroxy-5β-androstan-3-one (XV). When the latter is treated with about one mole-equivalent of a strong base, e.g., sodium hydroxide, in lower-alkanol solution at room temperature, the cyclic ketone linkage is cleaved and there is obtained 7α-carbolower-alkoxy-5-cyano-17β-hydroxy-5β-androstan-3-one (XVI). If more stringent basic hydrolysis conditions are used on Compound XV, for example, refluxing with sodium methoxide in methanol, the 5-cyano group is lost and a compound of Formula V is produced, e.g., 7α-carbomethoxy-4-androstan-17β-ol-3-one.

The compounds of Formulas XIII–XVI containing free hydroxy groups can be acylated by conventional esterification procedures, for example, by heating the carbinol compound with the appropriate acid halide or acid anhydride in the presence of pyridine, to give the corresponding lower-carboxylic acid acyloxy derivatives.

The present invention has provided a new class of steriod compounds, and these compounds have now been made available for study of their endocrinological and pharmacological activities. Compounds of the invention have been found to possess such activities as set forth below, and they are also useful as intermediates in the preparation of different species within the scope of the invention by introduction of new groups or alteration of groups already present by known methods.

Endocrinological and pharmacological studies of the compounds of the invention have shown that they possess useful metabolic hormonal and/or central nervous system regulant properties. In particular they exhibit such properties as anabolic, estrogenic, pituitary inhibiting, coronary dilator and anti-hypertensive activities.

The compounds of the invention can be prepared for use by dispersing them in an aqueous suspension or by dissolving them in a pharmacologically acceptable oil or oil-water emulsion for parenteral administration; or by incorporation in tablet form with excipients for oral administration.

The structures of the compounds of the invention were established by the modes of synthesis, by interpretation of the ultraviolet, infrared and nuclear magnetic resonance spectra, by preparation of molecular models, by the physical and chemical properties of the compounds, by conformational analysis, and by the fact that the values found upon elementary analysis corresponded with the values calculated for the assigned structures.

The following examples will further illustrate the invention without the latter being limited thereby.

*Example 1*

$7\alpha$-cyano-$17\alpha$-methyl-4-androsten-$17\beta$-ol-3-one [III; R' is $CH_3$, R" is OH]: A mixture of 30.0 g. (0.10 mole) of $17\alpha$-methyl-4,6-androstadien-$17\beta$-ol-3-one, 7.16 g. (0.11 mole) of potassium cyanide, 500 ml. of methanol, 50 ml. of water and 50 ml. of ethyl acetate was refluxed for two hours. The reaction mixture was concentrated in vacuo, 500 ml. of water was added to the residue, and the solid product was collected by filtration and dried. The product was dissolved in 200 ml. of methylene dichloride and chromatographed on a column of 750 g. of silica gel. The column was eluted with ether-methylene dichloride-pentane mixtures of increasing polar character, then with ether-methylene dichloride (9:1) and finally with ether-acetone (9:1). The material brought out by the last eluant was recrystallized from ethyl acetate to give $7\alpha$-cyano-$17\alpha$-methyl-4-androsten-$17\beta$-ol-3-one in the form of colorless needles, M.P. 221.6–225.0° C. (corr.), $[\alpha]_D^{25}=+65.1°$ (1% in chloroform); ultraviolet maximum at 237 m$\mu$ (E=16,000).

When measured by its effect upon the growth of the levator ani muscle in the rat, $7\alpha$-cyano-$17\alpha$-methyl-4-androsten-$17\beta$-ol-3-one was found to possess myotrophic activity with a low degree of androgenicity when administered subcutaneously at a dose level of 11.2 mg./kg./day, or orally at a dose level of 84 mg./kg./day.

By replacing the $17\alpha$-methyl-4,6androstadien-$17\beta$-ol-3-one in the foregoing preparation by a mole-equivalent amount of 4,6-androstadiene-3,17-dione, there can be prepared $7\alpha$-cyano-4-androstene-3,17-dione.

*Example 2*

$7\alpha$-cyano-4-androsten-$17\beta$-ol-3-one [III; R' is H, R" is OH]: A mixture of 100.0 g. (0.35 mole) of 4,6-androstadien-$17\beta$-ol-3-one, 91.0 g. (1.40 mole) of potassium cyanide, 1280 ml. of methanol, 320 ml. of water and 160 ml. of ethyl acetate was refluxed for six hours. The reaction mixture was concentrated in vacuo and the residue was partitioned between 1500 ml. of methylene dichloride and 1500 ml. of water. The methylene dichloride layer was separated and washed with four 500 ml. portions of 2 N hydrochloric acid. The acid extracts were made alkaline with sodium hydroxide and the precipitate was collected by filtration, washed with water and recrystallized from acetonitrile to give 43.2 g. of the bis-adduct, M.P. 240–247° C. (uncorr.) described below in Example 7.

The neutral product left behind in the methylene dichloride solution was chromatographed on a column of 1000 g. of silica gel. The column was eluted with ether-methylene dichloride-pentane mixtures of increasing polarity and then with ether-methylene dichloride (7:3). The later crystalline fractions were recrystallized successively from methanol, methylene dichloride-isopropyl alcohol and isopropyl alcohol alone to give $7\alpha$-cyano-4-androsten-$17\beta$-ol-3-one in the form of colorless needles, M.P. 277.2–285.0 C. (corr.), $[\alpha]_D^{25}=+80.2$ (1% in chloroform).

When measured by its effect upon the growth of the levator ani muscle in the rat, $7\alpha$-cyano-4-androsten-$17\beta$-ol-3-one was found to possess myotrophic activity with a low degree of androgenicity when administered subcutaneously at a dose level of 11.2 mg./kg./day.

$7\alpha$-cyano-4-androsten-$17\beta$-ol-3-one can be caused to react with propionic anhydride, caproyl chloride, $\beta$-cyclopentyl-propionyl chloride, benzoyl chloride, p-nitrobenzoyl chloride, 3,4,5-trimethyoxybenzoyl chloride, phenylacetyl chloride, cinnamoyl chloride or p-chlorophenoxycatyl chloride to give, respectively, $17\beta$-propionoxy-$7\alpha$-cyano-4-androsten-3-one, $17\beta$-caproyloxy-$7\alpha$-cyano-4-androsten-3-one, $17\beta$-($\beta$-cyclopentyl-propionoxy)-$7\alpha$-cyano-4-androsten-3-one, $17\beta$-benzoyloxy-$7\alpha$-cyano-4-androsten-3-one, $17\beta$-(p-nitrobenzoyloxy)-$7\alpha$-cyano-4-androsten-3-one, $17\beta$-(3,4,5-trimethoxybenzoyloxy)-$7\alpha$-cyano-4-androsten-3-one, $17\beta$-phenylacetoxy-$7\alpha$-cyano-4-androsten-3-one, $17\beta$-cinnamoyloxy-$7\alpha$-cyano-4-androsten-3-one or $17\beta$-(4-chlorophenoxyacetoxy)-$7\alpha$-cyano-4-androsten-3-one.

*Example 3*

$7\alpha$-cyano-$5\beta$-androstan-$17\beta$-ol-3-one [IV; R' is H, R" is OH]: A mixture of 9.50 g. of $7\alpha$-cyano-4-androsten-$17\beta$-ol-3-one (Example 2) and 0.50 g. of 10% palladium-on-charcoal catalyst in 300 ml. of ethyl alcohol was hydrogenated until one mole-equivalent of hydrogen had been absorbed. The mixture was filtered, the filtrate concentrated in vacuo and the residue recrystallized twice from ethanol to give 6.28 g. of $7\alpha$-cyano-$5\beta$-androstan-$17\beta$-ol-3-one, M.P. 167.6–172.4° C. (corr.), $[\alpha]_D^{25}=-0.6°$ (1% in chloroform).

*Example 4*

$7\alpha$-cyano-$17\alpha$-methyl-$5\beta$-androstan-$17\beta$-ol-3-one [IV; R' is $CH_3$, R" is OH] was prepared by hydrogenation of 6.58 g. of $7\alpha$-cyano-$17\alpha$-methyl-4-androsten-$17\beta$-ol-3-one (Example 1) by the method described above in Example 3. The product was recrystallized twice from ethyl acetate and repeatedly from ethanol to give $7\alpha$-cyano-$17\alpha$-methyl-$5\beta$-androstan-$17\beta$-ol-3-one, M.P. 217.4–218.8° C. (corr.), $[\alpha]_D^{25}=-18.6°$ (1% in chloroform).

A sample of the foregoing product was brominated in acetic acid to give the 4-bromo derivative, M.P. 181–182° C., and the latter was dehydrobrominated by heating with lithium bromide and lithium carbonate in dimethylformamide solution to give $7\alpha$-cyano-$17\alpha$-methyl-4-androsten-$17\beta$-ol-3-one, identical with the compound obtained above in Example 1. This provided evidence for the $5\beta$-configuration in the hydrogenation product.

*Example 5*

$7\alpha$-cyano-$17\alpha$-methyl-$5\beta$-androstane-$3\alpha,17\beta$-diol [VI]; R' is $CH_3$, R" is OH]: A solution of 1.00 g. of sodium borohydride in 10 ml. of water was added to a solution of 7.90 g. of $7\alpha$-cyano-$17\alpha$-methyl-$5\beta$-androstan-$17\beta$-ol-3-one (Example 4) in 50 ml. of ethanol and 50 ml. of tetrahydrofuran. The reaction mixture was kept at room temperature for three days, then made acid with acetic acid and diluted to 400 ml. with water. The solid product was collected by filtration and recrystallized twice from ethyl acetate to give $7\alpha$-cyano-$17\alpha$-methyl-$5\beta$-androstane-$3\alpha,17\beta$-diol in the form of colorless rods, M.P. 197.6–203.2° C. (corr.), $[\alpha]_D^{25}=-44.8°$ (1% in chloroform).

7α-cyano-17α-methyl-5β-androstane-3α,17β-diol when administered subcutaneously the female rats at a dose level of 10.0 mg./kg./day caused an increased number of vaginal smears, evidencing its estrogenic activity.

*Example 6*

4,7-amino-4-metheno-17α-methyl-5β-cyano-5β - androstan-17β-ol-3-one [XIII; R' is CH₃, R" is OH]: A mixture of 24.00 g. (0.08 mole) of 17α-methyl-4,6-androstadien-17β-ol-3-one, 26.00 g. (0.40 mole) of potassium cyanide, 320 ml. of methanol, 80 ml. of water and 40 ml. of ethyl acetate was refluxed for five hours. The reaction mixture was diluted to 1 liter with water and extracted three times with 300 ml. of methylene dichloride. The methylene dichloride extracts were washed with water and extracted five times with 600 ml. portions of 2 N hydrochloric acid. The acid extracts were made alkaline with sodium hydroxide and the solid product was collected by filtration and recrystallized from ethyl acetate to give 4,7-amino-4-metheno-17α-methyl-5β-cyano-5β-androstan - 17β-ol-3-one in the form of colorless prisms, M.P. 236.8–237.8° C. (corr.), $[\alpha]_D^{25} = -149.1°$ (1% in chloroform).

The neutral fraction from the foregoing reaction was chromatographed on silica gel and separated into three compounds, namely, 17α-methyl-4,6-androstadien-17β-ol-3-one (starting material), 7α-cyano-17α-methyl-4-androsten-17β-ol-3-one (the compound of Example 1) and 17α-methyl-5,7-dicyano-5β-androstan-17β-ol-3-one.

4,7-amino-4-metheno-17α-methyl-5β-cyano - 5β-androstan-17β-ol-3-one was found to have a coronary dilator activity about 10% that of papaverine when injected into isolated rabbit hearts at a dose level of 0.10 mg. per heart; and when administered to the renal hypertensive rat at a dose level of 100 mg./kg. it caused a blood pressure drop from 170 to 154 mm. Hg.

*Example 7*

4,7-amino-4-metheno-5β-cyano-5β-androstan - 17β - ol-3-one [XIII; R' is H, R" is OH] was prepared from 21.73 g. of 4,6-androstadien-17β-ol-3-one and 13.0 g. of potassium cyanide by the procedure described above in Example 6. The basic product was recrystallized twice from acetonitrile to give 4,7-amino-4-metheno-5β-cyano-5β-androstan-17β-ol-3-one in the form of colorless prisms, M.P. 239.4–242.0° C. (corr.), $[\alpha]_D^{25} = -102.9°$ (1% in chloroform), ultraviolet maximum at 302 mμ (E=11,900); infra-red absorption at 2.88, 2.94, 3.03, 3.13, 3.42, 4.47, 6.10, 6.66 and 6.91μ.

4,7-amino-4-metheno-5β-cyano-5β-androstan - 17β - ol-3-one when administered to the renal hypertensive rat at a dose level of 100 mg./kg. caused a blood pressure drop from 182 to 159 mm. Hg.

*Example 8*

4,7-carbonyl-5β-cyano-5β-androstan-17β-ol-3-one [XV]: A mixture of 10.00 g. of 4,7-amino-4-methano-5β-cyano-5β-androstan-17β-ol-3-one (Example 7) and 500 ml. of 2 N hydrochloric acid was heated for one and one-half hours on a steam bath. The solid product was collected by filtration, washed with water and recrystallized twice from acetonitrile to give 4,7-carbonyl-5β-cyano-5β-androstan-17β-ol-3-one in the form of colorless needles, M.P. 336–341° C. (uncorr.), $[\alpha]_D^{25} = +83.2°$ (1% in chloroform), ultraviolet maximum at 301 mμ (E=280); infra-red absorption at 2.84, 3.38, 3.44, 4.45, 5.68, 5.88 and 6.11μ.

4,7-carbonyl-5β-cyano-5β-androstan - 17β-ol-3-one can be caused to react with propionic anhydride, caproyl chloride, β-cyclopentylpropionyl chloride, benzoyl chloride, p-nitrobenzoyl chloride, 3,4,5-trimethoxybenzoyl chloride, phenylacetyl chloride, cinnamoyl chloride or p-chlorophenoxyacetyl chloride to give, respectively, 17β-propionoxy-4,7-carbonyl-5β-cyano-5β - androstan - 3-one, 17β-caproyloxy-4,7-carbonyl-5β - cyano - 5β - androstan-3-one, 17β-(β-cyclopentylpropionoxy)-4,7 - carbonyl-5β-cyano-5β-androstan-3-one, 17β-benzoyloxy-4,7-carbonyl-5β-cyano-5β-androstan-3-one, 17β - (p-nitrobenzoyloxy)-4,7-carbonyl-5β-cyano-5β-androstan - 3 - one, 17β-(3,4,5-trimethoxybenzoyloxy)-4,7-carbonyl-5β-cyano-5β-androstan-3-one, 17β-phenylacetoxy - 4,7 - carbonyl - 5β - cyano-5β-androstan-3-one, 17β-cinnamoyloxy-4,7 - carbonyl-5β-cyano-5β-androstan-3-one or 17β-(4-chlorophenoxyacetoxy)-4,7-carbonyl-5β-cyano-5β-androstan-3-one.

*Example 9*

3β - amino - 5β - carboxy - 7α - cyano - 17α - methyl-5β-androstane-3α,17β-diol-(3,5-lactam) [XIV; R' is CH₃]: A mixture of 6.00 g. of 4,7-amino-4-metheno-17α-methyl-5β-cyano-5β-androstan-17β-ol-3-one (Example 6), 60 ml. of 2 N sodium hydroxide and 300 ml. of methanol was allowed to stand at room temperature for six days. There was then added 10 ml. of acetic acid and the mixture was concentrated by distillation on a steam bath. Water was added to the residue and the solid product was collected by filtration and recrystallized from 95% ethanol to give 3β-amino-5β-carboxy-7α - cyano - 17α - methyl - 5β - androstane - 3α,17β-diol-(3,5-lactam), M.P. 277.2–280.2° C. (corr.), $[\alpha]_D^{25} = -36.8°$ (1% in chloroform); infrared absorption at 2.98, 3.03–3.13, 3.43 and 4.49μ.

*Example 10*

3β - amino - 5β - carboxy - 7α - cyano - 5β - androstane-3α,17β-diol-(3,5-lactam) 3,17-diacetate [XIV; R' is H, diacetate] was prepared from 6.80 g. of 4,7-amino-4-metheno-5β-cyano-5β-androstan-17β-ol-3-one, 40 ml. of 2 N sodium hydroxide and 300 ml. of methanol eight days at room temperature. The resulting product was separated and heated for one hour on a steam bath with 10 ml. of pyridine and 5 ml. of acetic anhydride. The latter mixture was then added to 400 ml. of water and extracted with methylene dichloride. The methylene dichloride extracts were washed with sodium bicarbonate solution and dilute hydrochloric acid, dried over anhydrous sodium sulfate and concentrated. The residue was recrystallized twice from ether to give 3β-amino-5β-carboxy - 7α - cyano - 5β - androstane - 3α,17β - diol-(3,5-lactam) 3,17-diacetate in the form of colorless prisms, M.P. 190.4–191.6° C. (corr.), $[\alpha]_D^{25} = -0.5°$ (1% in chloroform).

*Example 11*

5β - cyano - 7α - carbomethoxy - 5β - androstan - 17β-ol-3-one [XVI]: To a suspension of 3.41 g. of 4,7-carbonyl-5β-cyano-5β-androstan-17β-ol-3 - one (Example 8) in 400 ml. of ethanol was added 10 ml. of 1 N sodium hydroxide solution with stirring. The reaction mixture was allowed to stand at room temperature for fifteen hours, and then 0.6 ml. of acetic acid was added and the solvent removed by distillation in vacuo. Water was added to the residue, and the solid product was collected by filtration and recrystallized twice from methanol and three times from ethyl acetate to give 5β-cyano-7α-carbomethoxy-5β-androstan-17β-ol-3-one in the form of colorless prisms, M.P. 216.6–218.0° C. (corr.), $[\alpha]_D^{25} = +41.57°$ (1% in chloroform).

The 3-ethylene glycol ketal of 5β-cyano-7α-carbomethoxy-5β-androstan-17β-ol-3-one was prepared from 1.50 g. of 5β-cyano-7α-carbomethoxy-5β-androstan-17β-ol-3-one, 5 ml. of ethylene glycol and 0.1 g. of p-toluenesulfonic acid in 100 ml. of benzene refluxed for twenty hours under a water separator. The reaction mixture was washed with sodium bicarbonate solution, dried and concentrated to give 1.4 g. of ethylene glycol ketal, M.P. 182–184° C. (uncorr.); infrared absorption at 2.83, 3.42, 4.48, 5.80, 6.77, 6.87 and 6.94μ.

*Example 12*

5β-cyano-7α-carboxy-5β-androstan-17β - ol - 3 - one: A mixture of 6.82 g. of 4,7-carbonyl-5β-cyano-5β-androstan- 17β-ol-3-one (Example 8), 25 ml. of 1 N sodium hydroxide solution, 140 ml. of dioxane and 50 ml. of water was stirred at room temperature for about three days. There was then added 2 ml. of acetic acid and the reaction mixture was concentrated by distillation. The residue was extracted with isopropyl acetate, and the extracts were dried and concentrated. The latter residue was treated with dilute sodium bicarbonate, filtered, saturated with sodium chloride and acidified. The solid product was collected, dissolved in chloroform, filtered and the filtrate concentrated to dryness. The residue was recrystallized twice from ethyl acetate to give 5β-cyano-7α-carboxy-5β-androstan-17β-ol-3-one, M.P. 245.0–248.4° C. (corr.), $[\alpha]_D^{25}=+75.0°$ (1% in chloroform).

Example 13

7α-carbomethoxy-4-androsten-17β-ol-3-one [V; R' is H, R" is OH, Z is CH₃]: A mixture of 28.25 g. of 4,7-carbonyl-5β-cyano-5β-androstan-17β-ol-3-one (Example 8), 22.3 g. of sodium methoxide and 1700 ml. of methanol was refluxed for twenty hours. There was then added 25 ml. of acetic acid and the reaction mixture was concentrated by distillation in vacuo. Water was added to the residue and the product was collected by filtration and recrystallized from methanol to give 22.9 g. of 7α-carbomethoxy-4-androsten-17β-ol-3-one, M.P. 220.8–223.8° C. (corr.), $[\alpha]_D^{25}=+46.8°$ (1% in chloroform).

7α-carbomethoxy-4-androsten-17β-ol-3-one can also be prepared from 7α-cyano-4-androsten-17β-ol-3-one (Example 2) under the same reaction conditions.

7α-carbomethoxy-4-androsten-17β-ol-3-one when administered subcutaneously to female rats at a dose level of 10.0 mg./kg./day gave evidence of pituitary inhibition.

7α-carbomethoxy-4-androsten-17β-ol-3-one (5.00 g.) heated one hour on a steam bath with 25 ml. of pyridine and 10 ml. of acetic anhydride gave 7α-carbomethoxy-4-androsten-17β-ol-3-one 17-acetate, M.P. 198.5–201° C. (uncorr.).

Example 14

(a) 3-ethylene glycol ketal of 7α-carbomethoxy-4-androsten-17β-ol-3-one: A mixture of 17.60 g. of 7α-carbomethoxy-4-androsten-17β-ol-3-one (Example 13), 80 ml. of ethylene glycol, 1.0 g. of p-toluenesulfonic acid and 1000 ml. of benzene was refluxed for twenty hours under a water separator. The product was isolated and recrystallized from acetonitrile to give 3-ethylene glycol ketal of 7α-carbomethoxy-4-androsten-17β-ol-3-one, M.P. 160–165° C. (uncorr.); ultraviolet maxima at 219 and 245 mμ (E=1990 and 954); infrared absorption at 2.97, 3.42, 5.75, 6.02 and 6.18μ.

(b) 7α-hydroxymethyl-4-androsten-17β-ol-3-one diacetate [VIII; R' is H, R" is OH, Z is COCH₃]: A solution of 7.80 g. of the 3-ethylene glycol ketal of 7α-carbomethoxy-4-androsten-17β-ol-3-one in 150 ml. of tetrahydrofuran was added to a suspension of 4.00 g. of lithium aluminum hydride in 150 ml. of tetrahydrofuran in a nitrogen atmosphere. The reaction mixture was refluxed for 150 minutes, cooled, and 8 ml. of water was added dropwise. The reaction mixture was refluxed for fifteen minutes, filtered, and the filtrate concentrated in vacuo. The residue was heated for one-half hour on a steam bath with 80 ml. of acetic acid and 20 ml. of water. The solvent was removed in vacuo and the residue heated for two hours on a steam bath with 20 ml. of acetic anhydride and 40 ml. of pyridine and then added to 800 ml. of water. The solid product was collected by filtration and recrystallized twice from methanol to give 7α-hydroxymethyl-4-androsten-17β-ol-3-one diacetate, M.P. 212.0–213.0° C. (corr.), $[\alpha]_D^{25}=+30.2°$ (1% in chloroform); ultraviolet maximum at 240 mμ

(E=16,400)

infrared absorption at 3.42, 3.45, 5.72, 5.78, 6.00, 6.21, 6.80, 6.94 and 8.01μ.

Example 15

5α,7α-epoxymethano-5α-androstan-17β-ol-3-one [XII; R' is H, R" is OH]: To a solution of 5.51 g. of 7α-hydroxymethyl-4-androsten-17β-ol-3-one diacetate (Example 14) in 160 ml. of methanol was added 10 g. of potassium hydroxide followed by 10 ml. of water. The reaction mixture was refluxed for one hour and diluted with water to a volume of 200 ml. The product was collected by filtration and recrystallized from a chloroform-ethyl acetate mixture and then from chloroform alone to give 5α,7α-epoxymethano-5α-androstan-17β-ol-3-one in the form of colorless needles, M.P. 258.8–259.2° C. (corr.), $$[\alpha]_D^{25}=+20.6°$$

(1% in pyridine).

5α,7α-epoxymethano-5α-androstan-17β-ol-3-one treated with acetic anhydride in pyridine at room temperature gave the diacetate, M.P. 195–205° C. (uncorr.).

Example 16

7α-carbomethoxy-5β-androstan-17β-ol-3-one 17-acetate [VII; R' is H, R" is OH, Z is CH₃, acetate]: A solution of 7.93 g. of 7α-carbomethoxy-4-androsten-17β-ol-3-one (Example 13) in 300 ml. of ethanol was hydrogenated at room temperature in the presence of 0.20 g. of palladium-on-carbon catalyst. The reaction mixture was filtered, the filtrate concentrated in vacuo, and the residue heated one hour on a steam bath with 20 ml. of acetic anhydride and 40 ml. of pyridine. The reaction mixture was added to 800 ml. of water and extracted with methylene dichloride. The methylene dichloride extracts were washed with 2 N hydrochloric acid and 5% sodium bicarbonate solution, and dried over anhydrous magnesium sulfate. The solution was concentrated and the residue recrystallized twice from hexane to give 7α-carbomethoxy-5β-androstan-17β-ol-3-one 17-acetate in the form of colorless plates, M.P. 130.0–132.8° C. (corr.), $[\alpha]_D^{25}=+20.5°$ (1% in chloroform); infrared absorption at 3.43, 5.81, 6.92, 6.98, 8.02 and 8.70μ.

A sample of the crude hydrogenation mixture prior to acetylation was recrystallized twice from acetonitrile to give 7α-carbomethoxy-5β-androstan-17β-ol-3-one, M.P. 165–166° C. (uncorr.).

Example 17

7α-carboxy-5β-androstan-17β-ol-3-one [VII; R' is H, R" is OH, Z is H]: A mixture of 3.90 g. of 7α-carbomethoxy-5β-androstan-17β-ol-3-one 17-acetate (Example 16), 8.00 g. of potassium hydroxide, 160 ml. of ethanol and 40 ml. of water was refluxed for four hours. There was then added 8 ml. of acetic acid and the reaction mixture was concentrated to a small volume. The product was extracted with ethyl acetate, and the extracts were washed with saturated sodium chloride and dried over anhydrous magnesium sulfate. The solution was concentrated and the residue recrystallized twice from aqueous ethanol to give 7α-carboxy-5β-androstan-17β-ol-3-one, M.P. 218.5–221.5° C. (uncorr.); infrared absorption at 3.44, 3.90, 5.83 and 5.87μ.

7α-carboxy-5β-androstan-17β-ol-3-one (1.00 g.) and 10 ml. of acetic acid containing about 10% anhydrous hydrochloric acid kept at room temperature for about eighteen hours gave the 17-acetate, M.P. 258.2–259.8° C. (corr.) when recrystallized from acetonitrile; $[\alpha]_D^{25}=+6.2°$ (1% in chloroform); infrared absorption at 3.10, 3.44, 5.76, 5.89, 6.90 and 8.10μ.

Example 18

7α-carbomethoxy-5β-androstane-3,17-dione: To a solution of 40.49 g. of 7α-carbomethoxy-5β-androstan-17β-ol-3-one (Example 16) in 200 ml. of acetic acid, cooled in an ice-bath, was added a solution of 11.6 g. of chromic oxide in 12 ml. of water and 108 ml. of acetic acid over a period of about fifteen minutes. The reaction mixture was stirred two hours at room temperature, 25 ml. of methanol was added, and the mixture stirred fifteen minutes longer and poured into 3 liters of water. The solid which formed was collected by filtration, washed with water, dried at 65° C. in vacuo and recrystallized from an ethyl acetate-hexane mixture to give 30.7 g. of 7α-carbomethoxy-5β-androstane-3,17-dione, M.P. 134–137° C. (uncorr.).

Example 19

7α-hydroxymethyl - 5β - androstan-17β-ol-3-one 7,17-diacetate [X; R' is H, R" is OH, Z is COCH$_3$] was prepared by hydrogenation of 3.80 g. of 7α-hydroxymethyl-4-androsten-17β-ol-3-one 7,17-diacetate (Example 14) in 300 ml. of ethanol in the presence of 0.20 g. of 10% palladium-on-carbon catalyst. The product was recrystallized three times from ethyl acetate to give 7α-hydroxymethyl - 5β - androstan-17β-ol-3-one 7,17-diacetate in the form of colorless rods, M.P. 145.6–148.6° C. (corr.), $[\alpha]_D^{25} = -27.7°$ (1% in chloroform).

Example 20

7α-carbomethoxy - 17α - methyl-5β-androstane-3α,17β-diol [IX; R' is CH$_3$, R" is OH, Z is CH$_3$] can be prepared by treating 7α - cyano-17α-methyl-5β-androstane-3α,17β-diol (Example 5) with sodium hydroxide in methanol according to the procedure described above in Example 11.

Example 21

7α-hydroxymethyl - 17α - methyl-5β-androstane-3α,17β-diol [XI; R' is CH$_3$, R" is OH, Z' is H] can be prepared by reducing 7α-carbomethoxy-17α-methyl-5β-androstane-3α,17β-diol (Example 20) with lithium aluminum hydride according to the procedure described above in Example 14(b).

Alternatively, 7α-hydroxymethyl-17α-methyl-5β-androstane-3α,17β-diol can be prepared by reducing 7α-hydroxymethyl - 5β - androstan-17β-ol-3-one (Example 19) with sodium borohydride according to the procedure described above in Example 5.

Example 22

(a) 2-bromo-17α-carbomethoxy - 4 - androsten-17β-ol-3-one 17-acetate: A mixture of 5.57 g. of 7α-carbomethoxy-4-androsten-17β-ol-3-one 17-acetate (Example 13), 2.57 g. of N-bromo-succinimide and 300 ml. of carbon tetrachloride was heated to reflux and illuminated with a 200-watt lamp. After one-half hour the reaction mixture was cooled and filtered, and the filtrate was washed with water and concentrated to dryness. The residue was triturated with 20 ml. of ether and the product collected to give 6.45 g. of 2-bromo-17α-carbomethoxy-4-androsten 17β-ol-3-one 17-acetate, M.P. 189–190° C. (uncorr.)

(b) 7α - carbomethoxy-1,4-androstadien-3-one 17-acetate: A mixture of 2.34 g. of 2-bromo-17α-carbomethoxy-4-androsten-17β-ol-3-one 17-acetate, 0.90 g. of lithium carbonate, 1.04 g. of lithium bromide and 20 ml. of dimethylformamide was heated on a steam bath for about fifteen hours. The reaction mixture was added to 1 liter of water, and the solid product was collected and dissolved in 50 ml. of methylene dichloride. The solution was washed with water, dried over anhydrous magnesium sulfate and concentrated. The residue was recrystallized twice from methanol to give 7α-carbomethoxy-1,4-androstadien-3-one 17-acetate, M.P. 239–243° C. (uncorr.); ultraviolet maximum at 244 mμ (E=15,500); infrared absorption at 3.43, 5.77, 6.00, 6.18 and 6.25μ.

Example 23

7α-carbomethoxy-4-androstene-3,17-dione: To a solution of 13.84 g. of 7α-carbomethoxy-4-androsten-17β-ol-3-one (Example 13) in 200 ml. of acetic acid, cooled to 20° C., was added a solution of 4.00 g. of chromic oxide in 4 ml. of water and 36 ml. of glacial acetic acid. The reaction mixture was stirred for two hours, 10 ml. of isopropyl alcohol was added, and after stirring for one hour the mixture was poured into 1500 ml. of water. The solid product was collected by filtration, washed with water and dried at 70° C. in vacuo; yield 11.57 g., M.P. 205–207° C. (uncorr.). The product was recrystallized from methanol to give 7α-carbomethoxy-4-androstene-3,17-dione in the form of colorless prisms, M.P. 205.2–208.4° C. (corr.), $[\alpha]_D^{25} = +116.5°$ (1% in chloroform); ultraviolet maximum at 241 mμ (E=15,900).

7α-carbomethoxy-4-androstene-3,17-dione was converted to its diethylene glycol ketal (7α-carbomethoxy-3,17-bisethylenedioxy-5-androstene) by heating with ethylene glycol in benzene solution in the presence of p-toluenesulfonic acid. The diketal had the M.P. 182–184° C. when recrystallized from acetonitrile.

Example 24

(a) 7α-hydroxymethyl - 3,17-bisethylenedioxy-5-androstene: To a suspension of 4.80 g. of lithium aluminum hydride in 300 ml. of tetrahydrofuran in a nitrogen atmosphere was added a solution of 10.0 g. of 7α-carbomethoxy-3,17-bisethylenedioxy - 5 - androstene (Example 23) in 66 ml. of tetrahydrofuran. The reaction mixture was refluxed for two and one-half hours, then cooled and 10 ml. of water added dropwise. The mixture was heated to reflux, filtered and concentrated to dryness by distillation of the solvent. The residue was recrystallized several times from acetonitrile to give 7α-hydroxymethyl-3,17-bisethylenedioxy-5-androstene in the form of colorless needles, M.P. 192.2–195.4° C. (corr.), $[\alpha]_D^{25} = -111.1°$ (1% in chloroform).

(b) 7α-hydroxymethyl-4-androstene-3,17-dione and 5α,7α - epoxymethano-5α-androstane-3,17-dione: A mixture of 8.00 g. of 7α-hydroxymethyl-3,17-bisethylenedioxy-5-androstene, 40 ml. of acetic acid and 10 ml. of water was heated on a steam bath for one-half hour. The solvent was removed by distillation, water added to the residue, and the solid product collected by filtration. The product was taken up in a mixture of 500 ml. of methylene dichloride, 200 ml. of ether and 300 ml. of pentane and chromatographed on a column of 240 g. of silica gel. Elution of the column with the same solvent mixture brought out a solid product which when recrystallized from ethyl acetate gave 1.17 g. of 5α,7α-epoxymethano-5α-androstane-3,17-dione, M.P. 227–230° C. (uncorr.); ultraviolet maxima at 232 and 265 mμ (E=278 and 65); infrared absorption at 5.76, 5.85, 6.81 and 6.89μ.

Further elution of the chromatograph column with ether-methylene dichloride 1:1, ether-methylene dichloride 2:1, ether-methylene dichloride-acetone 4:5:1, ether-methylene dichloride-acetone 1:2:1 and methylene dichloride-acetone 1:1 brought out a second product which when recrystallized from ethanol gave 2.9 g. of 7α-hydroxymethyl-4-androstenene-3,7-dione, M.P. 246–249° C. (uncorr.); ultraviolet maximum at 242 mμ (E=15,900); infrared absorption at 2.97, 3.45, 5.76, 6.05, 6.10, 6.21 and 6.25μ.

Example 25

6α,7α-methano-4-androstene-3,17-dione: A mixture of 3.72 g. of 7α-hydroxymethyl-4-androstene-3,17-dione (Example 24), 6.68 g. of p-toluenesulfonyl chloride and 40 ml. of pyridine was heated on a steam bath for four hours. The reaction mixture was added to 400 ml. of ice-water and extracted with two 100 ml. portions of ethyl acetate. The extracts were washed twice with 200 ml. of 2 N hydrochloric acid and 200 ml. of saturated sodium bicarbonate solution, and dried over anhydrous magnesium sulfate in the presence of activated charcoal. The solution was filtered and concentrated by distillation in vacuo, and the residue was triturated with ether and recrystallized first from acetone-cyclohexane and then from acetonitrile to give 6α,7α-methano-4-androstene-3,17-dione, M.P. 194–204° C. (uncorr.).

We claim:
1. A member of the group consisting of (A) compounds of the formula

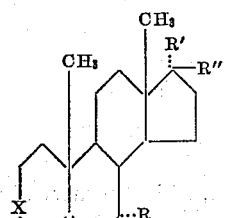

wherein R is a member of the group consisting of carboxy, carbo-lower-alkoxy, hydroxymethyl and lower-carboxylic acyloxymethyl wherein lower-carboxylic acyloxy has from one to ten carbon atoms; R' is a member of the group consisting of hydrogen and lower-alkyl; R" is a member of the group consisting of hydroxy and lower-carboxylic acyloxy having from one to ten carbon atoms; and X is a member of the group consisting of O=C and (α-HO)CH; (B) compounds of the above formula wherein X is O=C and there is a double bond at the 4,5-position; (C) compounds of the above formula wherein X is O=C and there are two double bonds, one at the 1,2- and the other at the 4,5-position; and (D) compounds as defined under (A), (B) and (C) wherein R' and R" together represent carbonyl oxygen.

2. 7α-cyano-5β-androstan-17β-ol-3-one.
3. 7α-cyano-17α-methyl-5β-androstan-17β-ol-3-one.
4. 7α-cyano-17α-methyl-5β-androstane-3α,17β-diol.
5. 5β-cyano-7α-carboxy-5β-androstan-17β-ol-3-one.
6. 7α-carbomethoxy-4-androsten-17β-ol-3-one.
7. 7α-hydroxymethyl-4-androsten - 17β-ol-3-one diacetate.
8. 7α-carbomethoxy-5β-androstan-17β-ol-3-one 17-acetate.
9. 7α-carboxy-5β-androstan-17β-ol-3-one.
10. 7α-carbomethoxy-5β-androstane-3,17-dione.
11. 7α-hydroxymethyl-5β-androstan-17β-ol-3-one 7,17-diacetate.
12. 7α-carbomethoxy-1,4-androstadien-3-one 17 - acetate.
13. 7α-carbomethoxy-4-androstene-3,17-dione.
14. 17α-methyl-5,7-dicyano-5β-androstan-17β - ol - 3- one.
15. 7α-hydroxymethyl-4-androstene-3,17-dione.
16. 6α,7α-methano-4-androstene-3,17-dione.
17. A member of the group consisting of (A) compounds of the formula

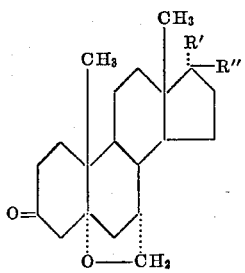

wherein R' is a member of the group consisting of hydrogen and lower-alkyl, and R" is a member of the group consisting of hydroxy and lower-carboxylic acyloxy having from one to ten carbon atoms; and (B) the compounds of the above formula wherein R' and R" together represent carbonyl oxygen.

18. 5α,7α-epoxymethano-5α-androstan-17β-ol-3-one.
19. 5α,7α-epoxymethano-5α-androstane-3,17-dione.
20. A compound of the formula

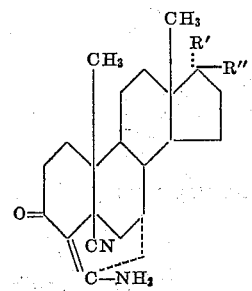

wherein R' is selected from the group consisting of hydrogen and lower-alkyl, and R" is selected from the group consisting of hydroxy and lower-carboxylic acyloxy having from one to ten carbon atoms.

21. 4,7-amino-4-metheno-17α-methyl - 5β - cyano-5β-androstan-17β-ol-3-one.
22. 4,7-amino-4-metheno-5β-cyano-5β-androstan - 17β ol-3-one.
23. 4,7-carbonyl-5β-cyano-5β-androstan-17β-ol-3-one.
24. A compound of the formula

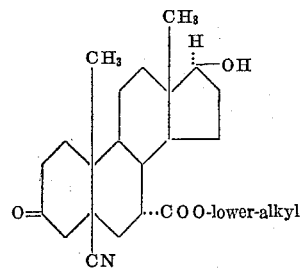

25. 5β-cyano-7α-carbomethoxy-5β-androstan-17β-ol - 3-one.
26. A member of the group consisting of compounds of the formula

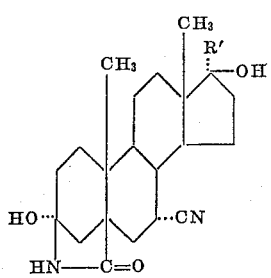

wherein R' is selected from the group consisting of hydrogen and lower-alkyl; and lower-carboxylic acid esters thereof derived from carboxylic acids having from one to ten carbon atoms.

27. 3β-amino-5β-carboxy-7α-cyano-17α-methyl-5β - androstane-3α,17β-diol-(3,5-lactam).
28. 3β-amino-5β-carboxy-7α-cyano-5β-androstane - 3α, 17β-diol-(3,5-lactam) 3,17-diacetate.

29. The process for preparing a compound of the formula

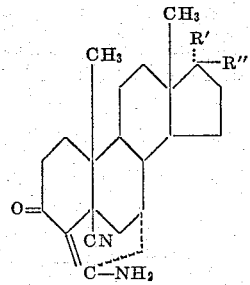

which comprises treating a compound of the formula

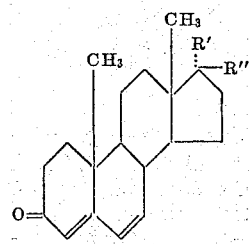

with at least about two mole-equivalents of an alkali metal cyanide, wherein R' is a member of the group consisting of hydrogen and lower-alkyl, and R" is a member of the group consisting of hydrogen and lower-carboxylic acyloxy having from one to ten carbon atoms, and isolating the acid-soluble fraction of the product.

30. A member of the group consisting of (A) compounds of the formula

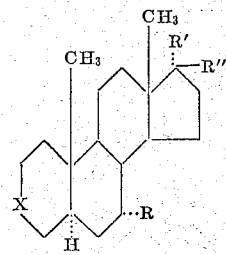

wherein R is cyano, R' is a member of the group consisting of hydrogen and lower-alkyl; R" is a member of the group consisting of hydroxy and lower-carboxylic acyloxy having from one to ten carbon atoms; and X is a member of the group consisting of O=C and ($\alpha$-HO)CH; and (B) compounds as defined under (A) wherein R' and R" together represent carbonyl oxygen.

References Cited by the Examiner

UNITED STATES PATENTS 3,050,518  8/62  Bowers et al. _____ 260—239.55
3,099,664  7/63  Ringold et al. _____ 260—397.3

OTHER REFERENCES

Bowers, "Journ. Org. Chem.," vol. 26, page 2043 (1961).

LEWIS GOTTS, *Primary Examiner.*